US006296571B1

(12) United States Patent
McVicar

(10) Patent No.: US 6,296,571 B1
(45) Date of Patent: Oct. 2, 2001

(54) STEERING WHEEL SPRING ASSEMBLY

(75) Inventor: David McVicar, El Dorado, CA (US)

(73) Assignee: Logitech Europe S.A., Romanel-sur Morges (CH)

( * ) Notice: Subject to any disclaimer, the term of this patent is extended or adjusted under 35 U.S.C. 154(b) by 0 days.

(21) Appl. No.: 09/260,385

(22) Filed: Mar. 2, 1999

(51) Int. Cl.[7] .............................. A63F 13/00; A63F 9/24; G06F 17/00; G06F 19/00
(52) U.S. Cl. ................................. 463/38; 463/36; 463/37; 463/46; 463/47; 273/148 B; 273/148 R; 345/156; 345/184
(58) Field of Search .................................. 463/38, 63, 36, 463/37, 47, 46; 472/19, 21, 28, 47, 88, 108, 113; 273/148 B; 345/156, 157, 158, 171, 184; 180/6.2, 6.24, 6.6, 9.38, 9.54

(56) References Cited

U.S. PATENT DOCUMENTS

| | | | |
|---|---|---|---|
| 3,777,410 | * | 12/1973 | Robinson ............................... 434/323 |
| 4,258,838 | * | 3/1981 | Rockola et al. ....................... 194/206 |
| 4,399,882 | * | 8/1983 | O'Neill et al. .................... 180/6.48 X |
| 4,603,752 | * | 8/1986 | Chambers et al. ................. 180/6.4 X |
| 4,630,817 | * | 12/1986 | Buckley ................................. 463/37 |
| 4,713,007 | * | 12/1987 | Alban ..................................... 463/37 |
| 4,817,950 | * | 4/1989 | Goo ........................................ 463/36 |
| 4,887,966 | * | 12/1989 | Gellerman ............................. 463/38 |
| 5,261,291 | * | 11/1993 | Schoch et al. .................. 74/484 R X |
| 5,409,226 | * | 4/1995 | Mesko et al. ..................... 273/148 B |
| 5,591,082 | * | 1/1997 | Jensen et al. ........................... 463/38 |
| 5,630,756 | * | 5/1997 | Thurston et al. ...................... 463/38 |
| 5,713,794 | * | 2/1998 | Shimojima et al. ................... 463/36 |
| 5,790,101 | * | 8/1998 | Schoch et al. .................... 345/161 X |
| 5,805,138 | * | 9/1998 | Brawne et al. ....................... 345/156 |
| 5,854,622 | * | 12/1998 | Brannon ............................... 345/161 |
| 5,868,620 | * | 2/1999 | Wada et al. ............................ 463/38 |
| 5,947,824 | * | 9/1999 | Minami et al. ........................ 463/37 |
| 5,967,898 | * | 10/1999 | Takasaka et al. ...................... 463/37 |
| 6,020,875 | * | 2/2000 | Moore et al. ........................ 345/156 |
| 6,030,290 | * | 2/2000 | Powell .................................. 463/36 |
| 6,050,897 | * | 4/2000 | Suzuki et al. ......................... 463/37 |
| 6,059,660 | * | 5/2000 | Takada et al. ......................... 463/38 |

* cited by examiner

Primary Examiner—Jessica J. Harrison
Assistant Examiner—Binh-An D. Nguyen
(74) Attorney, Agent, or Firm—Townsend and Townsend and Crew LLP

(57) ABSTRACT

An improved mechanical linkage may be used in devices such as a non-powered PC gaming steering wheel controller. In one embodiment, the linkage is part of a steering wheel assembly. The assembly provides a steering wheel shaft having a flange extending radially from the shaft. A first coil spring and a second coil spring are attached to the flange to return the flange and the steering wheel shaft to a neutral position. The coil springs typically are mounted between a base of the steering wheel assembly and the flange portion of the shaft. The flange is sized to facilitate rotation of the steering wheel shaft without causing the coil springs to bend about the shaft. The coil spring preferably has an elongate portion that is offset from the centerline of the coil spring. This offset distance preferably allows the shaft to rotate to at least 120° in the clockwise or counterclockwise direction from its neutral position without causing the elongate portion of the spring to bend. Eliminating bending in the spring improves the lifespan of the spring.

20 Claims, 4 Drawing Sheets

STEERING WHEEL SPRING ASSEMBLY

BACKGROUND OF THE INVENTION

The present invention relates generally to mechanical linkages, and more specifically to mechanical linkages for use in computer peripherals such as a steering wheel controller and the like.

On non-powered, non-force feedback personal computer (PC) gaming steering wheel devices, springs are sometimes used to provide rotational resistance to the turning of the steering wheel. In part, the resistance is used to simulate the turning resistance of a steering wheel used in actual cars and racing machines. Additionally, however, the springs are also used to create a self-centering steering wheel which will return the wheel to a neutral, center position when the steering wheel is ungripped. This self-centering quality facilitates game play and further simulates real life driving conditions where the steering wheel tends to be somewhat self-centering when ungripped by the driver.

Most of these non-powered PC gaming steering wheels as shown in FIG. 1, typically have a steering wheel W mounted onto a shaft S that is contained within the controller housing H. The self-centering mechanisms which control the rotational position of the shaft S and the wheel W, are preferably contained within the housing H.

In conventional steering wheel devices, the typical spring loaded device is restricted to approximately 180° of total wheel rotation (i.e. 90° rotation in clockwise and counterclockwise direction) if a long spring life and self-centering of the wheel is desired. This is because the extension springs used to self-center the steering wheel shaft must first be stretched straight and then bent around the main shaft of the steering wheel to complete rotation greater than 90° in a clockwise or counterclockwise direction for a total of 180° of rotation. For example, FIG. 2 shows a conventional steering wheel shaft S with an elastomeric spring E. FIG. 2 shows the shaft rotated 90° from its neutral or resting position. As seen in FIG. 2, the elastomeric spring E remains in a substantially straight configuration. As the steering wheel shaft S is rotated further, to 120° from its neutral position, the elastomeric spring E is bent at location B as shown in FIG. 3. It is this type of bending that shortens the life span of the spring. Although a variety of different types of springs such as coil springs, elastomeric cords, or similar bias members have been used, the lateral stress posed on the spring due to the bending around the steering wheel shaft eventually leads to early spring failure in these conventional assemblies.

Accordingly, it would be desirable to provide an improved self-centering steering wheel assembly which allows for a greater degree of wheel rotation, such as a total of 240° rotation, while maintaining a long lifespan for the springs in the assembly. Such a self-centering steering wheel assembly would improve lifespan of the spring by preventing the bending of the spring about the steering wheel shaft while increasing the range of rotational motion.

SUMMARY OF THE INVENTION

The present invention provides a self-centering steering wheel assembly having a unique flange and bias member combination as described below. The flange is mounted radially about a steering wheel shaft. The bias member, which is typically a coil spring, is pivotally coupled to the flange and has a substantially straight elongate portion offset from a center axis of the bias member by an offset distance. By offsetting the substantially straight portion of the bias member from its center axis (i.e., a straight portion from a side of a coil spring, instead of the center), the offset distance advantageously allows the steering wheel shaft to rotate at least about 120° in a clockwise or counterclockwise direction without causing the straight portion to bend. The offset distance allows the spring to move to the "other side" of the steering wheel shaft centerline without causing the substantially straight portion of the bias member to bend. This allows for the long spring life and self-centering quality of the steering wheel assembly.

In one embodiment, the present invention provides a steering wheel shaft having a flange extending radially from the shaft. A first coil spring and a second coil spring are attached to the flange to return the flange and the steering wheel shaft to a neutral position. The coil springs typically are mounted between a base of the steering wheel assembly and the flange portion of the shaft. The flange is sized to facilitate rotation of the steering wheel shaft without causing the coil springs to bend about the shaft. The coil spring preferably has an elongate portion that is offset from the centerline of the coil spring. As mentioned previously, this offset distance allows the shaft to rotate to at least about 120° from its neutral position without causing the elongate portion of the spring to bend. Preferably, the elongate portion of the coil spring has a length sufficient to allow the shaft to rotate to about 120° in either clockwise or counterclockwise direction without the coil portion of the spring contacting the flange and interfering with the rotation of the steering wheel shaft. Additionally, when the steering wheel shaft is in a neutral position, the coil springs are mounted at a pre-load angle which provides sufficient force to overcome losses in bearings of the steering wheel shaft while the angle is also small enough to prevent the straight portion of the coil spring from interfering with the shaft when the shaft is rotated to 120° from its neutral position.

A further understanding of the nature and advantages of the invention will become apparent by reference to the remaining portions of the specification and drawings.

DESCRIPTION OF THE SPECIFIC EMBODIMENTS

The present invention provides a mechanical linkage for use in devices such as a non-powered PC gaming steering wheel controllers. The present invention provides an apparatus that adds a self-centering quality to the steering wheel controller while allowing for a greater degree of rotational motion without reducing the lifespan of bias members used in the steering wheel controller. The self-centering quality causes the steering wheel to return to a neutral rotational position when the user is not turning or gripping the steering wheel. This return force of the self-centering steering wheel assembly provides for a more realistic gaming experience and also provides resistance that simulates the steering wheel "feel" associated with real cars and driving vehicles. The present invention advantageously allows the lifespan of the steering wheel to exceed 300,000 cycles while increasing the total rotational motion from 180° to 240°.

Figure 4:
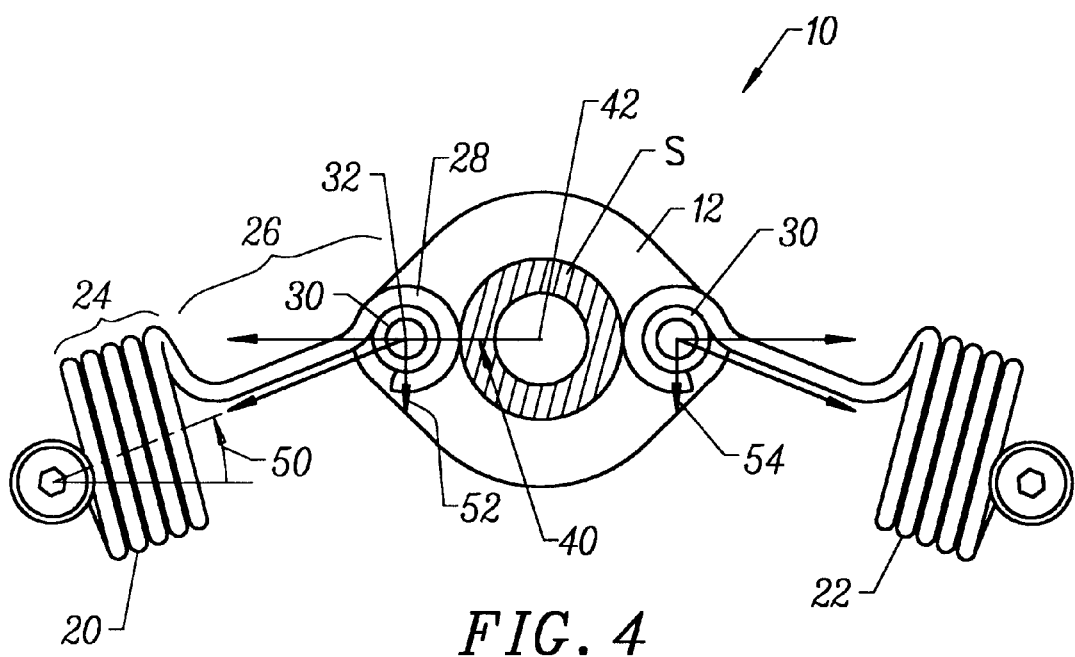
FIGS. 4 and 5 are cross-sectional views of a steering wheel assembly according to the present invention when looking down the steering wheel shaft of the assembly.
Figure 5:
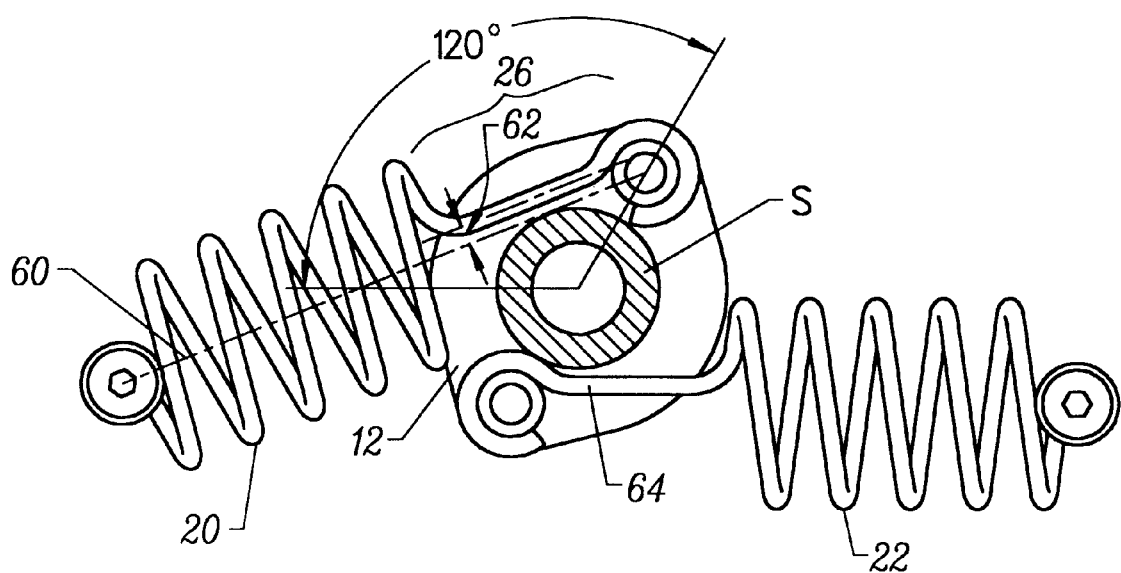

Referring now to FIGS. 4 and 5, a self-centering steering wheel assembly according to the present invention will be described in further detail. FIG. 4 shows a view of the steering wheel assembly 10 as viewed when looking longitudinally down the shaft S. A flange 12 is mounted radially about the shaft S. The flange 12 may be integrally formed with the shaft S, interference fit with the shaft, or otherwise attached to the shaft. The flange 12 is coupled to at least one bias member. The embodiment of FIG. 4 uses a first coil spring 20 and a second coil spring 22 as the bias members. For a steering wheel assembly to be "self centering," two bias members or extension springs of equal spring rate are preferably attached to moment arms extending from the main shaft on one end, and then angled down on both sides to create an initial force in each spring with a component of the force pointing down on each side of the main shaft of equal magnitude. These springs create equilibrium due to opposite and equal moments being applied to the shaft. If the wheel is turned either way the springs are stretched to create a moment force which acts to restore the wheel to the centered position.

In the embodiment of FIG. 4, the first coil spring 20 has a coiled portion 24 and a substantially straight elongate portion 26. This straight portion 26 is preferably long enough to prevent the coils from interfering with the shaft when the spring is extended as shown in FIG. 5. In the embodiment of FIG. 4, the distal end of the elongate portion has a eye hook which pivotally mounts to a connection point 30 on the flange 12. The connection point 30 may be a pin, stud, or similar protrusion located on the flange 12. The connection has a center 32. The flange 12 and shaft S define a moment arm 40 which extends from a center 42 of the shaft S to a center 32 of the connection point 30. The arm length of the moment arm 40 preferably allows the coil spring 20 to move from a neutral position, as illustrated in FIG. 4, to a rotated position, as shown in FIG. 5, without causing the substantially straight elongate portion 26 to bend about the steering wheel shaft S. The moment arm 40 is preferably long enough to allow for space between the long straight section and the main shaft at rotations greater than about 90° while being short enough to prevent interference with the coils on the spring when extended.

As seen in FIG. 4, the coil springs are preferably mounted at pre-load angle 50 which provides a return force when the shaft is in the neutral position. When in the neutral position, the downward force as indicated by arrows 52 and 54 are substantially equivalent. The pre-load angle on the coil springs 20 and 22 preferably provide sufficient force to overcome losses in the bearings of the steering wheel shaft. The pre-load angle is also preferably small enough to prevent the straight portion of the coil spring from interfering with the rotation of the shaft. An excessively strong or high pre-load angle will reduce the range of motion of the shaft S before the substantially straight elongate portion 26 begins to bend. The main shaft diameter of assembly is preferably small enough to provide space between the straight section of the spring and the main shaft beyond 90 degrees and large enough to provide the needed strength.

Figure 1:
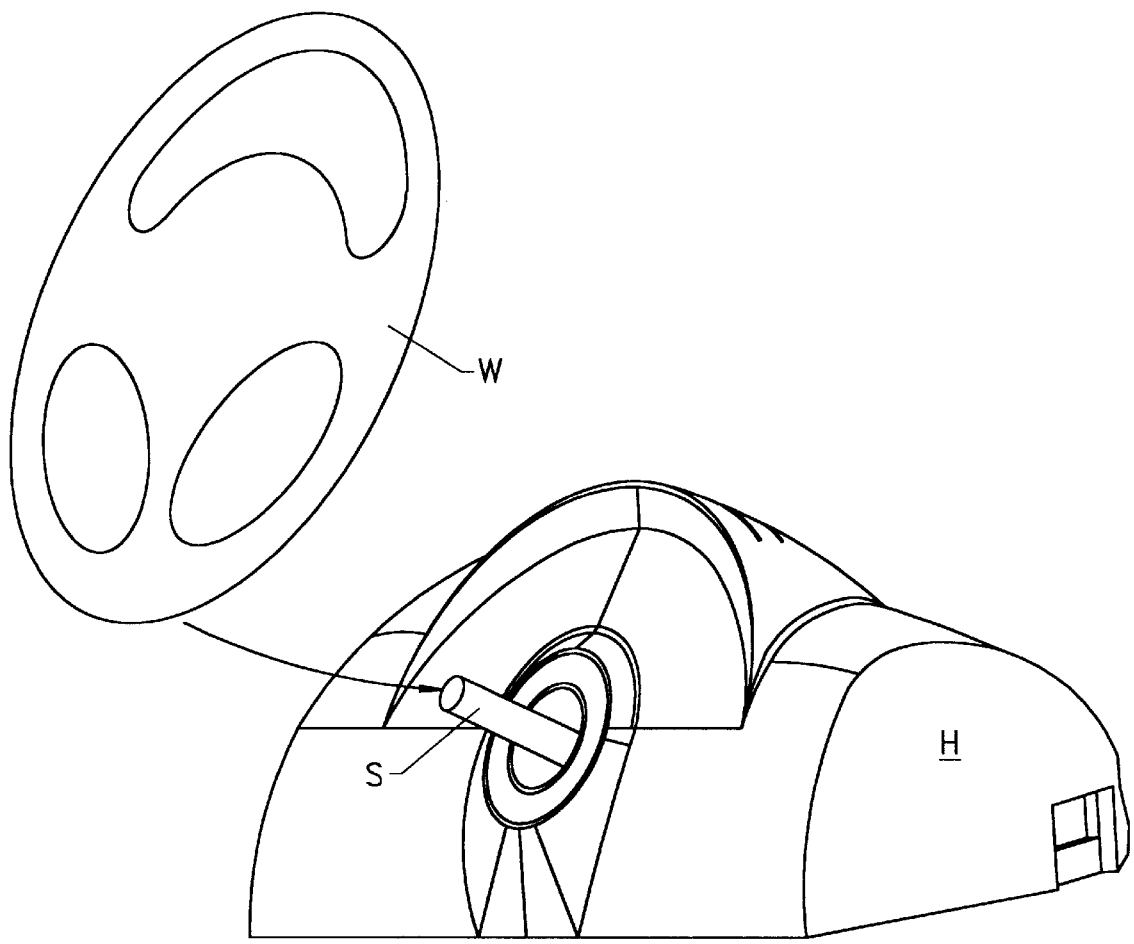
FIG. 1 shows a perspective view of a non-powered PC gaming steering wheel for use in computer games.
Figure 2:
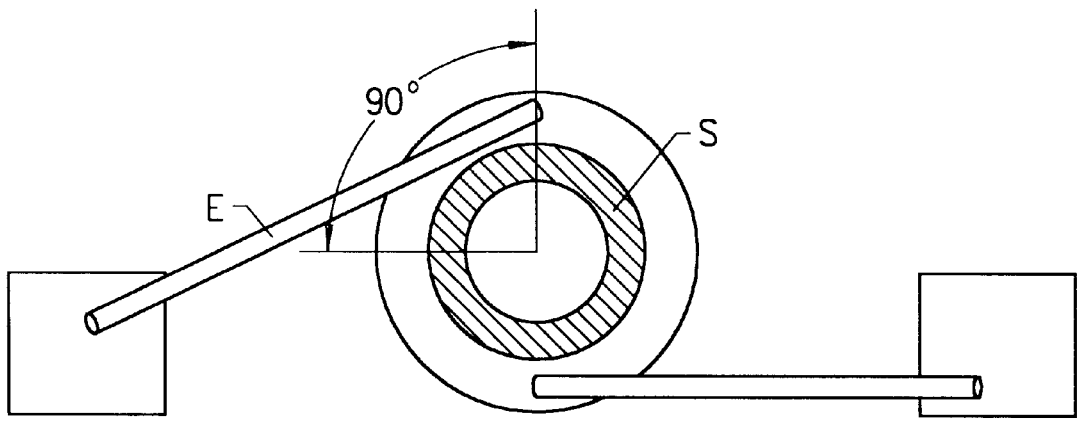
FIGS. 2 and 3 show cross-sectional views of known steering wheel assemblies when looking down the shaft of the steering wheel assembly.
Figure 3:
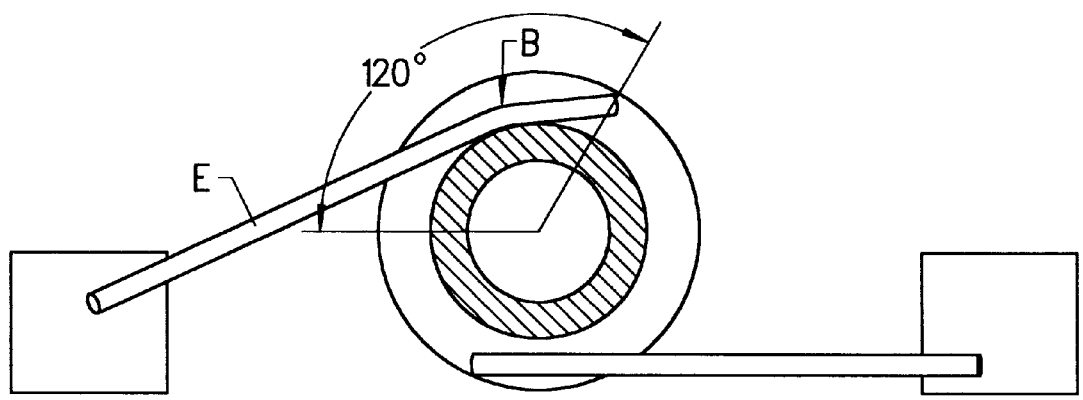

As seen now in FIG. 5, the steering wheel shaft S may be rotated at least 120° from the neutral position shown in FIG. 4. As seen in FIG. 5, at this 120° position, the substantially straight portion 26 of the coil spring 20 remains in a substantially straight configuration. Hence, the coil spring is simply extended and then compressed during the rotation of the shaft S. Rotation which causes the portion 26 to bend will decrease the life span of the coil spring 20. Hence, it is desirable to maintain this linear extension and compression of the coil spring 20. As seen in FIG. 5, the elongate portion 26 is offset from a center axis 60 of the coil spring 20 by an offset distance 62. It is this offset distance that allows the steering wheel shaft S to rotate 120° without causing the coil spring to bend about the shaft. As seen in FIGS. 2 and 3, most known steering wheel assemblies can move to a 90° position, but further rotation will cause their spring member to bend about the shaft S. The greater the offset distance 62, the larger the rotational movement is available to the steering wheel shaft S. It should be understood, however, that the offset distance cannot be overly increased so as to cause the elongate portion 26 to bend when the spring is located underneath the steering wheel shaft S, as illustrated by the position 22. Overly increasing the offset distance may cause bending at point 64. Preferably, the offset distance 62 allows the steering wheel shaft S to rotate at least 90° clockwise or counterclockwise beyond the neutral position, and more preferably, at least 120° in the clockwise and counterclockwise direction. Preferably, the elongate portion 26 also has a length sufficient to allow the steering wheel shaft to rotate to its maximum rotational position, such as 120°, without causing the coil portion 24 to contact the flange 12. Such contact may interfere with the rotation of the steering wheel shaft and also reduce the life span of the coil spring.

Figure 6:
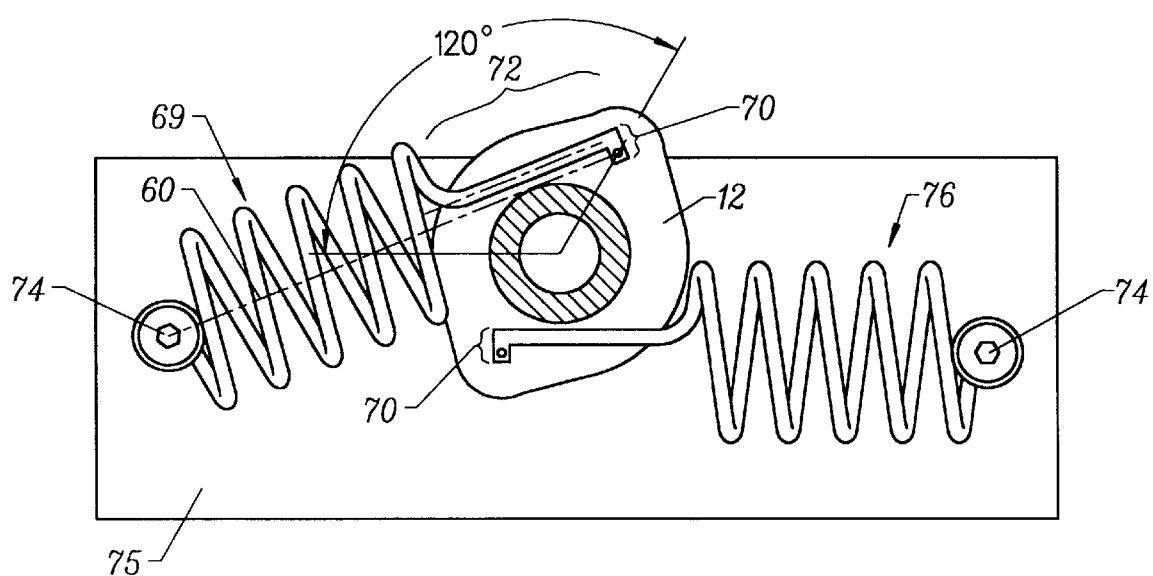
FIG. 6 shows a cross-sectional view of another embodiment of the steering wheel assembly according to the present invention.

Referring now to FIG. 6, in another embodiment of the present invention, the coil spring 69 has a protrusion 70 located at the distal end of the elongate portion 72 to provide the desired offset distance. The protrusion 70 functions similarly to the eye hook in FIGS. 4–5. Protrusion 70 is pivotally mounted at connection point 73 to the flange 12 and is used to space the elongate portion 72 apart from the center line 60. The spring 69 is preferably mounted between connection point 73 on the flange 12 and a connection point 74 on a base 75. The same can be said of spring 76. The offset distance in spring 69 may be measured from the centerline of the elongate portion 72 to the center axis 60 of the spring member, or the offset distance may be measured from the outer surface of the elongate portion to the center line 60 of the bias member. Additionally, the elongate portion 72 is not necessarily parallel to the longitudinal center axis of the spring member. The elongate portion 72 may be angled relative to the center axis 60 so long as sufficient offset distance remains to allow the steering wheel shaft S to rotate beyond about 90° from the neutral position and preferably at least about 120° from the neutral position.

While the above is a complete description of the preferred embodiments of the invention, various alternatives, modifications, and equivalents may be used. For example, the spring assembly is applicable to devices outside of the computer industry. In some embodiments, the spring may also be angled upward, instead of downward as shown in the figures, so long as they provide a return force to center the shaft. While the above description is complete, it should not be taken as limiting the scope of the invention which is defined by the appended claims.

What is claimed is:

1. A self-centering steering wheel assembly comprising:

a steering wheel shaft;

a flange extending radially from said shaft; and a bias member pivotally coupled to the flange to provide a force to return the steering wheel shaft to a neutral position, said bias member having a substantially straight elongate portion radially offset by an offset distance from a center axis of the bias member;

wherein said offset distance is sufficient to allow the steering wheel shaft to rotate at least about 120° in a clockwise direction and at least about 120° in the counterclockwise direction from said neutral position without causing said substantially straight elongate portion to bend.

2. A self-centering steering wheel assembly as in claim 1, wherein said bias member is pivotally coupled to the flange at a connection point, and wherein said flange defines a moment arm having an arm length from a center of the shaft to a center of the connection point.

3. A self-centering steering wheel assembly as in claim 2 wherein said connection point comprises a pin on said flange.

4. A self-centering steering wheel assembly as in claim 1 comprising a plurality of bias members.

5. A self-centering steering wheel assembly as in claim 4 further comprising a base;

wherein said bias members comprises a first coil spring coupled to a first connection point on the flange and a connection point on said base and a second coil spring coupled to a second connection point on the flange and a second connection point on the base.

6. A self-centering steering wheel assembly as in claim 1 wherein the bias member comprises a spring having said elongate portion.

7. A self-centering steering wheel assembly as in claim 1 wherein the bias member comprises a coil spring having said elongate portion and a coil portion.

8. A self-centering steering wheel assembly as in claim 7 wherein the elongate portion of the coil spring has a length sufficient to prevent contact of the coil portion with the flange when the steering wheel shaft is rotated to about 120° in the clockwise direction and about 120° in the counterclockwise direction from said neutral position.

9. A self-centering steering wheel assembly as in claim 1 wherein the distal end of the elongate portion has an eye hook pivotally mounted about a connection point on the flange.

10. A self-centering steering wheel assembly as in claim 1 wherein a distal end of the elongate portion has a protrusion adapted to place said substantially straight elongate portion said offset distance away from the center line of the bias member.

11. A self-centering steering wheel assembly as in claim 1 wherein the bias member is mounted at a preload angle when the shaft is in a neutral position, said preload angle allowing the bias member to provide sufficient force to overcome frictional losses of the steering wheel shaft and said preload angle being small enough to prevent the substantially straight portion of the bias member from interfering with the shaft when said shaft is rotated to about 120° from said neutral position of the shaft.

12. A self-centering steering wheel assembly as in claim 1 wherein the bias member comprises a coil spring wherein said elongate portion has a length sufficient to prevent said elongate portion of the spring from contacting said steering wheel shaft when said shaft is turned about 120° from said neutral position of the shaft.

13. A self-centering steering wheel assembly as in claim 1 wherein said steering wheel shaft has a diameter less than about 20 mm.

14. A self-centering steering wheel assembly comprising:

a steering wheel shaft;

a flange radially mounted about said shaft;

at least one elongate link; and means coupling said at least one elongate link to said flange for returning the steering wheel shaft to a neutral position when the shaft is rotated, wherein said at least one elongate link each remains in a substantially straight configuration through about 120° of rotation of the shaft in both clockwise and counterclockwise directions from the neutral position.

15. A self-centering steering wheel assembly as in claim 14 wherein said means for returning the steering wheel shaft comprises at least one bias member each connected to one said elongate link and wherein said elongate link is offset from a center axis of the bias member by an offset distance.

16. A self-centering steering wheel assembly as in claim 15 wherein said means for returning the steering wheel shaft comprises at least one coil spring each connected to one said elongate link.

17. A self-centering steering wheel assembly as in claim 15 wherein said means for returning the steering wheel shaft comprises at least one coil spring each integrally formed with one said elongate link.

18. A self-centering steering wheel assembly as in claim 15 wherein said bias member has a first end connected to a base and a second end connected to a first end of said elongate link, and wherein said elongate link has a second end pivotally connected to the flange.

19. A self-centering steering wheel assembly as in claim 18 wherein the first end of said bias member is pivotally connected to the base.

20. A self-centering steering wheel assembly as in claim 18 wherein the second end of said bias member and the first end of said elongate link are fixedly connected together.

* * * * *